United States Patent
Loch et al.

(10) Patent No.: US 10,783,243 B2
(45) Date of Patent: Sep. 22, 2020

(54) DYNAMIC, NON-INVASIVE TAINT TRACKING USING AUTO-GENERATED DATATYPES

(71) Applicant: SAP SE, Walldorf (DE)

(72) Inventors: Florian Loch, Karlsruhe (DE); Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 323 days.

(21) Appl. No.: 15/862,347

(22) Filed: Jan. 4, 2018

(65) Prior Publication Data

US 2019/0205532 A1 Jul. 4, 2019

(51) Int. Cl.
| | | |
|---|---|---|
| *G06F 21/55* | (2013.01) |
| *H04L 29/06* | (2006.01) |
| *G06F 3/06* | (2006.01) |
| *G06F 12/14* | (2006.01) |
| *G06F 21/53* | (2013.01) |

(52) U.S. Cl.
CPC .......... *G06F 21/552* (2013.01); *G06F 3/0622* (2013.01); *G06F 12/1416* (2013.01); *G06F 21/53* (2013.01); *H04L 63/145* (2013.01); *H04L 63/1408* (2013.01)

(58) Field of Classification Search
CPC ...... G06F 21/552; G06F 21/53; G06F 3/0622; G06F 12/1416; G06F 21/16; H04L 63/145; H04L 63/1408
See application file for complete search history.

(56) References Cited

U.S. PATENT DOCUMENTS

2011/0145918 A1* 6/2011 Jung ................. G06F 21/52
726/22
2013/0091578 A1* 4/2013 Bisht ................. G06F 21/53
726/25

(Continued)

OTHER PUBLICATIONS

Mohammed Aboullaite. "Understanding JIT compiler (just-in-time compiler)" Aug. 31, 2017 (7 pages) https://aboullaite.me/understanding-jit-compiler-just-in-time-compiler/ (Year: 2017).*

(Continued)

*Primary Examiner* — Joseph P Hirl
*Assistant Examiner* — Thomas A Gyorfi
(74) *Attorney, Agent, or Firm* — Jones Day

(57) ABSTRACT

Systems and methods are provided herein for dynamic, non-invasive taint tracking using auto-generated datatypes. A proxy entry point component of a taint-aware environment continuously monitors for a request to initiate an application. The application has an associated runtime environment and profile parameters specific to the application. Upon identifying the request, a core component of the taint-aware environment generates a set of augmented classes based on the profile parameters. The set of augmented classes contains taint-tracking functionality. The proxy entry point component modifies an initiation pathway of the application to force the runtime environment to retrieve the set of augmented classes prior to execution of the application. The runtime environment continuously monitors for tainted data or tainted code passed through or contained within the application based on the taint-tracking functionality of the set of augmented classes.

20 Claims, 9 Drawing Sheets

(56) References Cited

U.S. PATENT DOCUMENTS

2018/0359266 A1\* 12/2018 Andow ............... H04L 63/1416
2019/0108332 A1\* 4/2019 Glew .................... G06F 21/552

OTHER PUBLICATIONS

Mohammed Aboullaite. "Understanding JIT compiler (just-in-time compiler)" Published Aug. 31, 2017 (7 pages) https://aboullaite.me/understanding-jit-compiler-just-in-time-compiler/ (Year: 2017).\*
V. Haldar, D. Chandra and M. Franz, "Dynamic taint propagation for Java," 21st Annual Computer Security Applications Conference (ACSAC'05), Tucson, AZ, 2005, (7 pages) (Year: 2005).\*
OWASP. OWASP Top 10—2017 rc1. url: https://www.owasp.org/index.php/Category:OWASP_Top_Ten_Project.
Sebastian Lekies, Ben Stock, and Martin Johns. "25 million flows later: large-scale detection of DOM-based XSS". In: Proceedings of the 2013 ACM SIGSAC conference on Computer & communications security. ACM. 2013, pp. 1193-1204.
Vivek Haldar, Deepak Chandra, and Michael Franz. "Dynamic taint propagation for Java". In: Proceedings—Annual Computer Security Applications Conference, ACSAC. 2005, pp. 303-311. isbn: 0769524613. doi:10.1109/CSAC.2005.21.
William G J Halfond, Alessandro Orso, and Panagiotis Manolios. Using Positive Tainting and Syntax-Aware Evaluation to Counter SQL Injection Attacks. 2006.

T Lindholm and F Yellin. "The Java Virtual Machine Specification, Java SE 7 Edition". In: The Java Virtual Machine Specification (2013), p. 606. url: http://docs.oracle.com/javase/specs/jvms/se7/jvms7.pdf.
Tim Lindholm et al. "The Java Virtual Machine Specification, Java SE 8 Edition". In: (2015), p. 604. url: http://docs.oracle.com/javase/specs/jvms/se8/jvms8.pdf.
Jonathan Bell and Gail Kaiser. "Dynamic Taint Tracking for Java with Phosphor ( Demo )". In: (2015), pp. 409-413. doi:10.1145/2771783.2784768.
James Clause, Wanchun Li, and Alessandro Orso. "Dytan: a generic dynamic taint analysis framework". In: Proceedings of the 2007 international symposium on Software testing and analysis (2007), pp. 196-206. doi:10.1145/1273463.1273490.
William Enck et al. "TaintDroid: An Information-Flow Tracking System for Realtime Privacy Monitoring on Smartphones". In: ACM Trans. Comput. Syst. ACM Transactions on Computer Systems 5 (2014). doi:10.1145/2619091.
Lukas Weichselbaum et al. "ANDRUBIS: Android Malware Under the Magnifying Glass," Vienna University of Technology, Tech. Rep. TR-ISECLAB-0414-001, 2014.
Erika Chin and David Wagner. "Efficient character-level taint tracking for Java". In: Proceedings of the 2009 ACM workshop on Secure web services. ACM, 2009, pp. 3-12.
Christof Dallermassl. Dynamic Security Taint Propagation in Java via Java Aspects. Last updated Mar. 31, 2017. url: https://github.com/cdaller/security_taint_propagation.

\* cited by examiner

700

Array of chars: | H | E | L | L | O |   | W | O | R | L | D |

Array of taint-flags: | 0 | 0 | 0 | 0 | 1 | 0 | 0 | 2 | 0 | 0 | 0 |

FIG. 7

DYNAMIC, NON-INVASIVE TAINT TRACKING USING AUTO-GENERATED DATATYPES

TECHNICAL FIELD

The subject matter described herein relates to dynamic taint tracking of applications of a runtime environment.

BACKGROUND

As computer programs and applications continue to increase in sophistication, the risk of cyber-attacks also continues to increase. Cyber-attacks can result in disastrous outcomes such as data corruption, denial of access, and/or data breaches of personal information such as names, addresses, phone numbers, credit card numbers, social security numbers, and the like. Code injection attacks are one example of the many types of cyber-attacks and are widespread in software development. With a code-injection attack, an attacker can inject code into an application that can change the course of its execution.

Taint-tracking is one mechanism used to detect and/or prevent a wide range of injection attacks. With taint-tracking, taint checks are performed to monitor for tainted information. Such tracking is often performed by the application and/or runtime environment which in turn increases the memory usage and performance overhead of one or more data processors. Additionally, taint-tracking mechanisms are typically added to existing runtime environments (e.g., Java™, PHP, Nodejs) and therefore modify the runtime environment in a non-pluggable manner. Such modification can affect the portability and/or maintainability of the runtime environment of an application requiring such monitoring.

SUMMARY

In one aspect, a proxy entry point component of a taint-aware environment continuously monitors for a request to initiate an application. The application has an associated runtime environment and profile parameters specific to the application. Upon identifying the request, a core component of the taint-aware environment generates a set of augmented classes based on the profile parameters. The set of augmented classes contains taint-tracking functionality. The set of augmented classes can include system class code or non-system class code. In some variations, the set of augmented classes can be identified by an application-specific instrumentation profile. The proxy entry point component modifies an initiation pathway of the application to force the runtime environment to retrieve the set of augmented classes prior to execution of the application. The runtime environment continuously monitors for tainted data or tainted code passed through or contained within the application based on the taint-tracking functionality of the set of augmented classes.

In some variations, the runtime environment can identify tainted data or tainted code based on the taint-tracking functionality of the set of augmented classes. The runtime environment can remedy the tainted data or the tainted code by at least one of providing a user alert on a graphical user interface, preventing the application from executing, or injecting identification data into the tainted data or the tainted code to flag the presence of the tainted data or the tainted code.

In other variations, an agent component of the taint-aware environment can modify the non-system class code using byte-code instrumentation to include the taint-tracking functionality.

In some variations, the core component can interface with a template component containing stanzas to generate the set of augmented classes using stored string templates.

In other variations, the taint tracking functionality can identify the tainted data or the tainted code at a character level.

In some variations, the application can further include at least one command line parameter provided by a user of the application.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for a dynamic, non-invasive taint-tracking approach which auto-generates datatype implementations tailored to a given application's security requirements. Use of this dynamic, non-invasive taint-tracker can reduce memory overhead of the processing system running the monitoring application as well as increase the overall processing performance of the processing system. Additionally, use of the subject matter provides increased portability by being easily pluggable into other runtime environment implementations such as virtual machines.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is an example taint-tracking application using a character-level, multi-source tracking approach;

Like reference symbols in the various drawings indicate like elements.

DETAILED DESCRIPTION

Taint-tracking adds additional metadata to variables and maintains the binding of metadata and values during execution of an application. A taint-tracking system maintains and propagates this metadata during program execution and/or dataflow. Depending upon the purpose of a taint-tracking system, the definition of "tainted" can vary. For example, tainted information can be the information used to prevent attacker-controlled strings to enter security sensitive functions. Alternatively, tainted information can be the information used to prevent leakage of sensitive information retrieved from an internal database such as an in-memory database. Regardless of its definition, when tainted information leaves an application through a sink, an application can check whether information coming from a given source is allowed to enter a specific sink and can inhibit or prohibit such information accordingly. Sources and/or sinks can include client device applications, database drivers, and/or file systems.

In order to improve processing capabilities and other unnecessary overhead of a particular application, tailored taint-tracking can be performed based on an application-specific implementation profile. Character-level taint-tracking can be used, for example, within a runtime environment such as a virtual machine through code instrumentation and/or augmentation by using application specification instrumentation profiles and adaptive instrumentation. However, such tracking can be used in a variety of applications and is not restricted to virtual machines. Character-level taint-tracking as described in detail below can track attacker controlled data on a character-level. Additionally, character-level taint-tracking can differentiate between different sources of taint and allowing the optional addition of further information/flow of metadata such as stack traces and/or attacker profiles.

Figure 1:
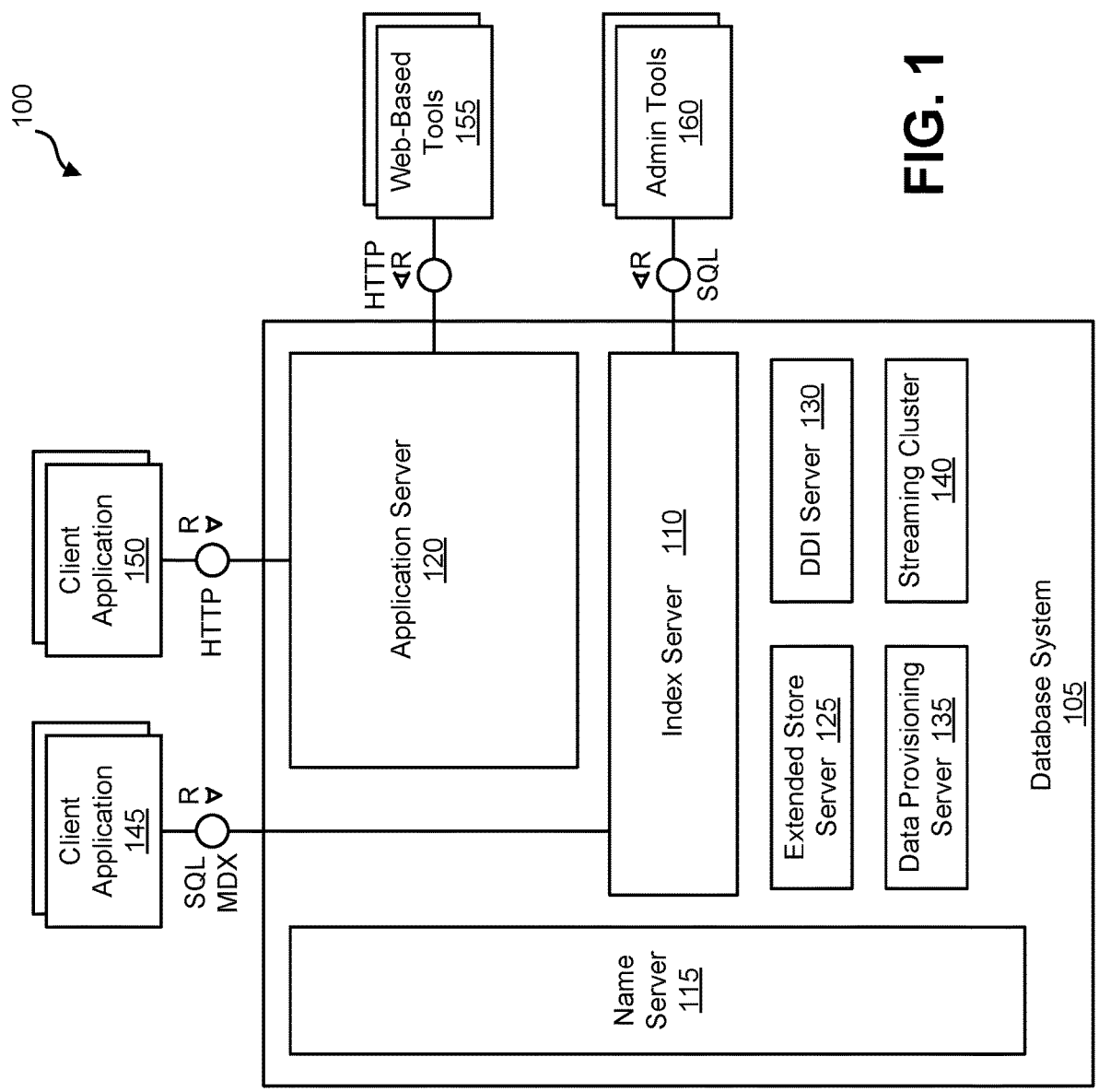
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input output (I/O) and in which disk storage is required to make any changes durable. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management, and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter software development kit (SDK) for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
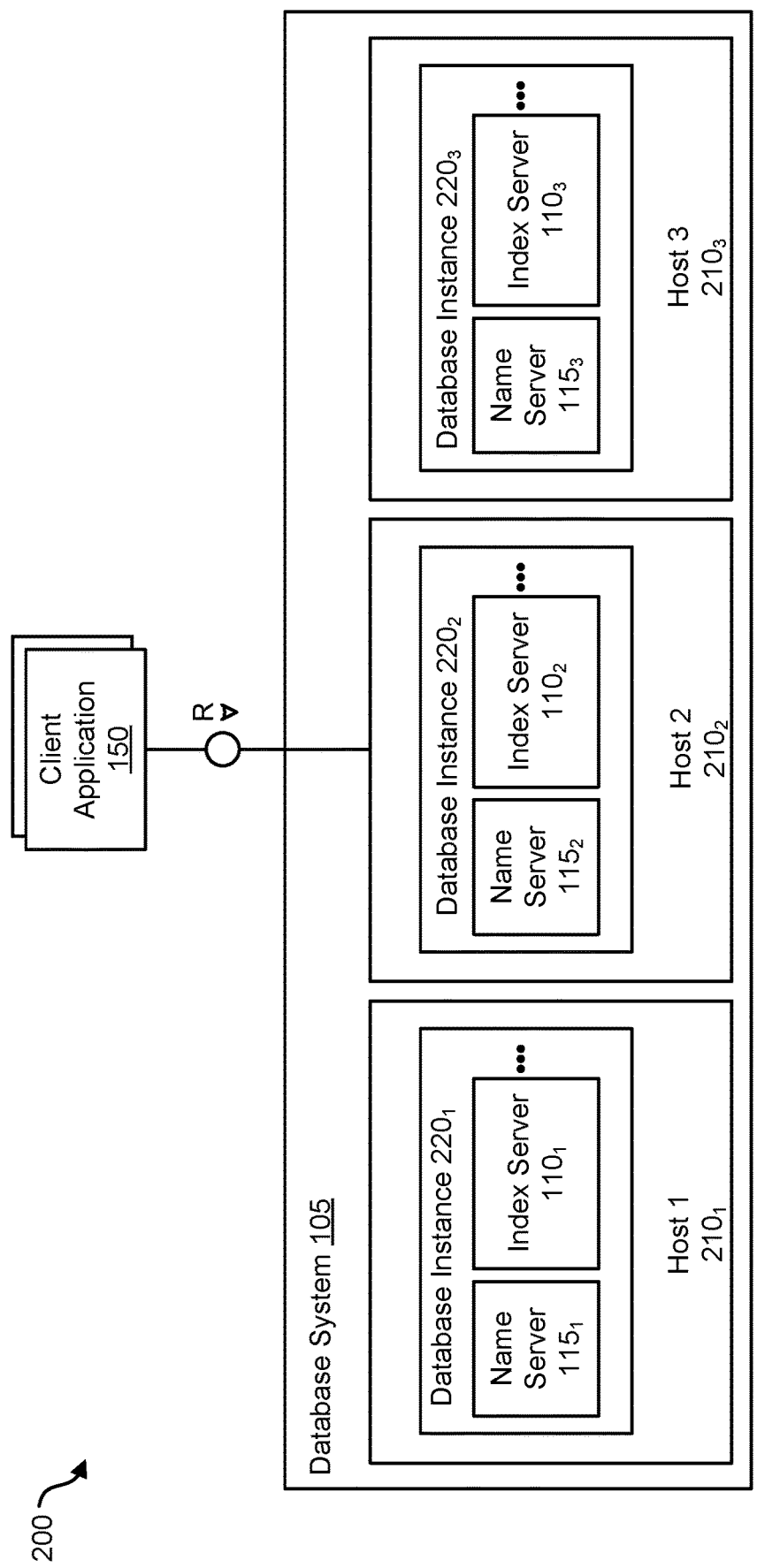
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers 1101-3, 1201-3, in the system, if required.

As is illustrated in FIG. 2, the distributed database system 105 can be installed on more than one host 2101-3. Each host 2101-3 is a machine that can comprise at least one data processor (e.g., a CPU, etc.), memory, storage, a network interface, and an operation system and which executes part of the database system 105. Each host 2101-3 can execute a database instance 2201-3 which comprises the set of components of the distributed database system 105 that are installed on one host 2101-3. FIG. 2 shows a distributed system with three hosts, which each run a name server 1101-3, index server 1201-3, and so on (other components are omitted to simplify the illustration).

Figure 3:
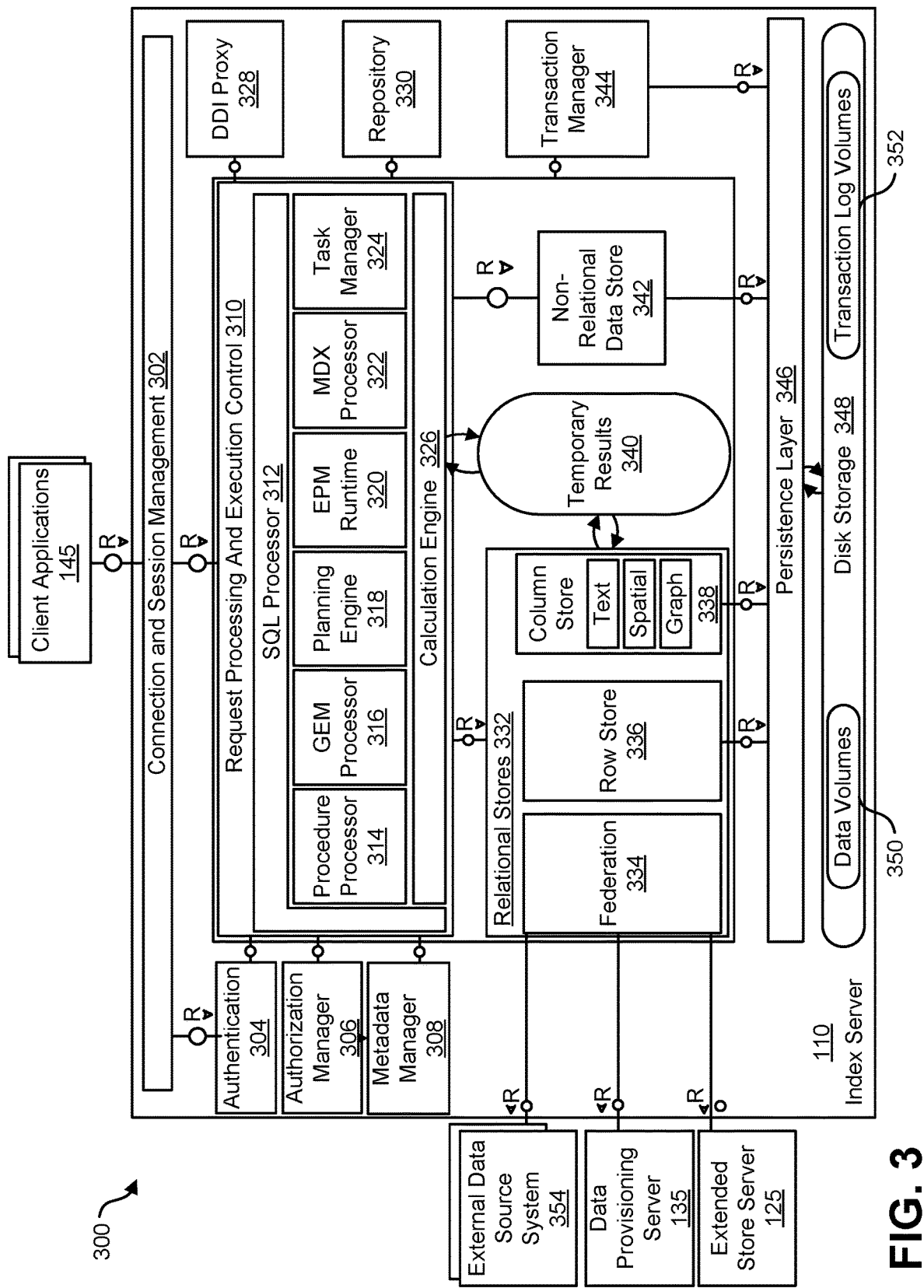
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 306. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead, it is built using the column store 338, which can have a dedicated graph Application Program Interface (API).

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and save points. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 346 stores data in persistent disk storage 348 which, in turn, can include data volumes 350 and/or transaction log volumes 352 that can be organized in pages. Different page sizes can be supported, for example, between 4k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
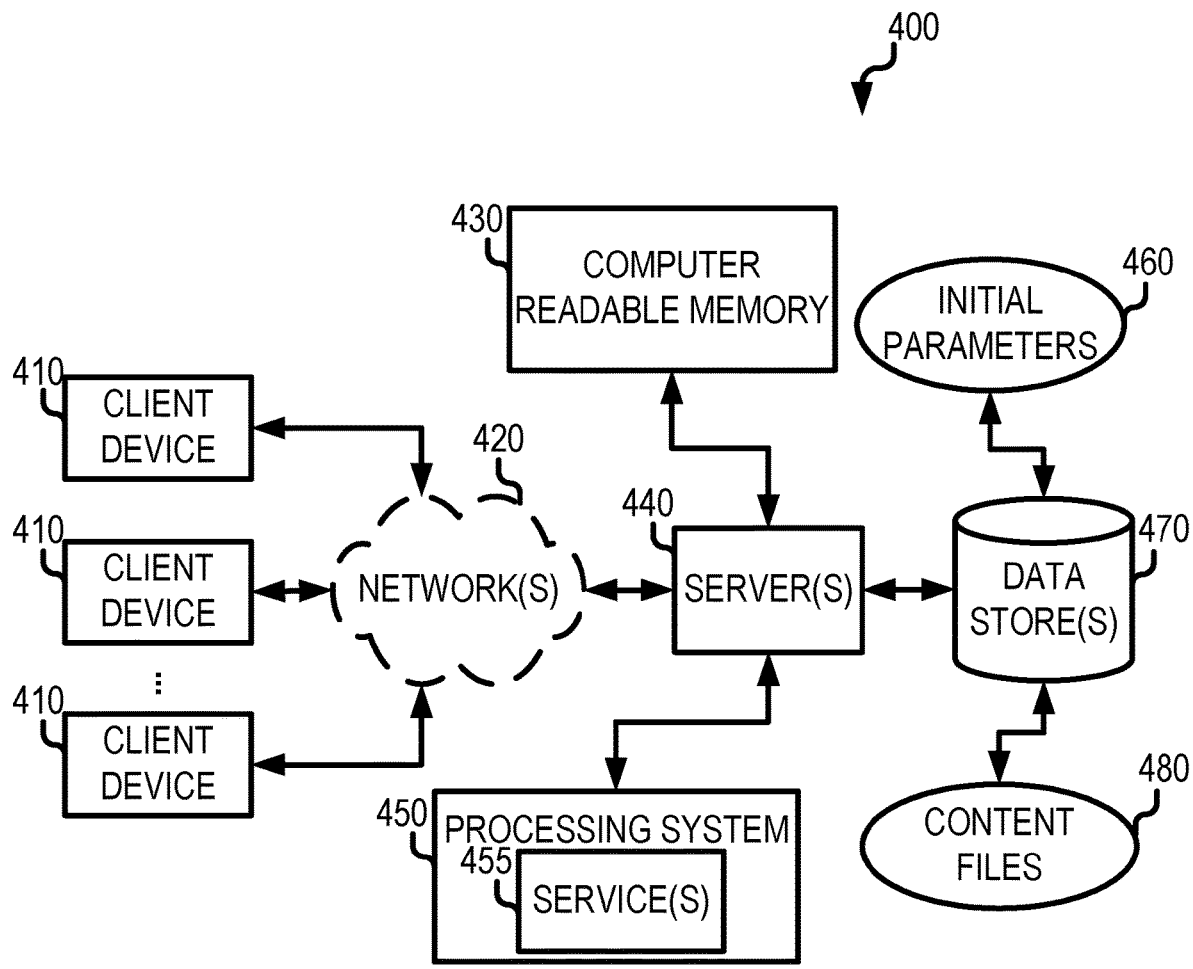
FIG. 4 is a diagram illustrating an example implementation system of a client-server architecture for use in connection with the current subject matter.

FIG. 4 is a diagram illustrating an example implementation system 400 of a client-server architecture for use in connection with the current subject matter. One or more client devices 410 access one or more servers 440 running one or more services 455 on a processing system 450 via one or more networks 420. Alternatively, client device 410 and server 440 can be the same computing device eliminating the need for network 420. Client application 145, 150 can be deployed and/or run on one or more client devices 410 or processing system 450. One or more servers 440 can access computer-readable memory 430 as well as one or more data stores 470. One or more data stores 470 can include initial parameters 460 as well as content files 480.

Figure 5:
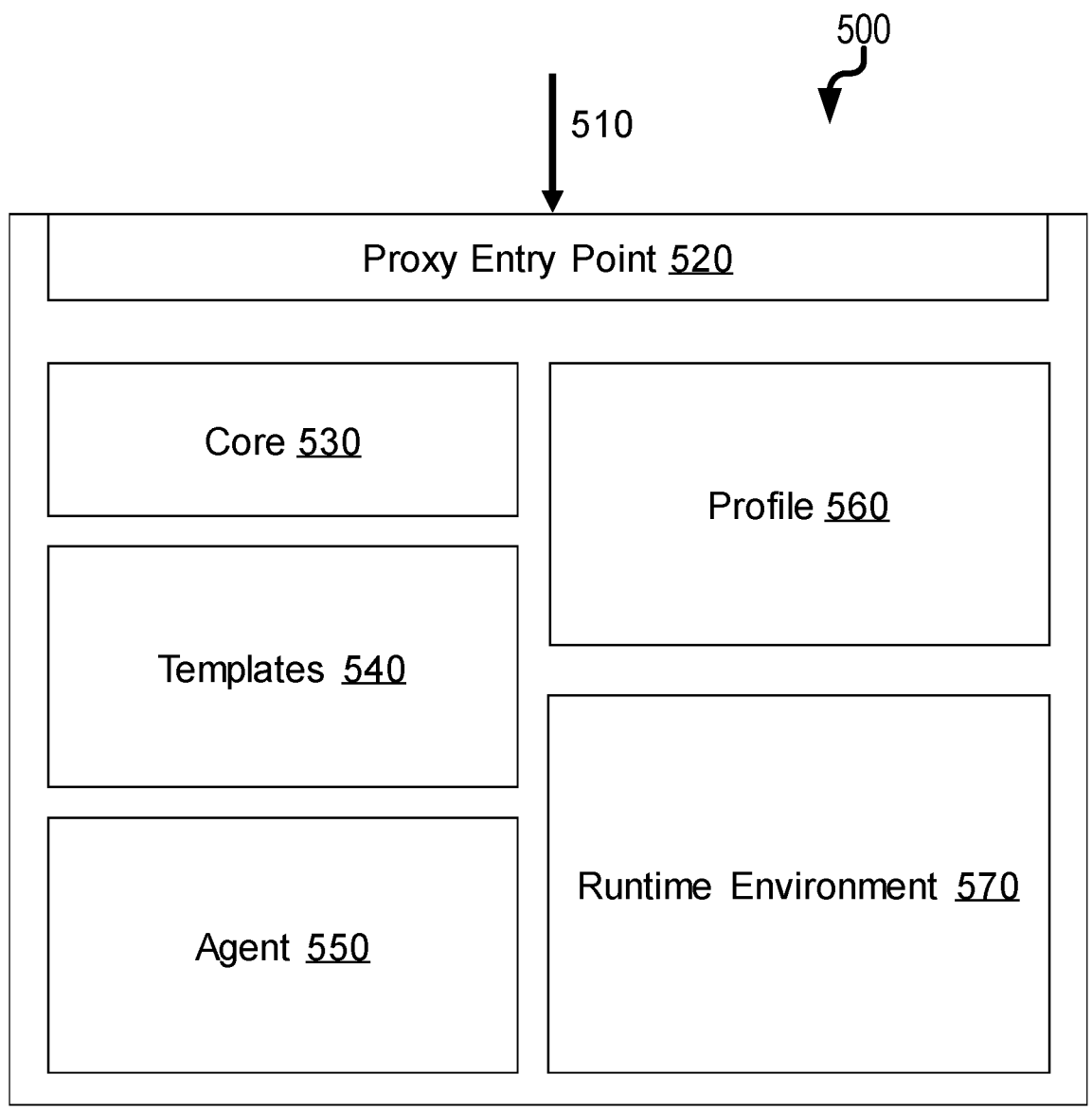
FIG. 5 is a system diagram illustrating an example system architecture of a taint-aware runtime environment.

FIG. 5 is a system diagram illustrating an example system architecture of a taint-aware runtime environment 500. Taint-aware runtime environment 500 can be a part of a runtime environment. Taint-aware runtime environment 500 can wrap around an existing runtime environment 570 by adding a plurality of taint-tracking components including a new, proxy entry point 520, core 530, templates 540, agent 550, and/or profile 560. Such wrapping can be transparent to runtime environment 570 and can be done on a source-code level of respective class implementations by augmenting class code such as system class code (e.g., code utilizing standard inputs, standard outputs, and/or error output streams capable of accessing parameters external to the defined properties and/or environment variables within the code) and/or non-system class code. The code augmentation can utilize a dual code strategy by modifying system class code as well as non-system class code. For example, when using Java™ code, system classes can be augmented on a source level and Java' byte-code of an application, such as a third party application, can be instrumented.

With systems classes, for example, taint-aware runtime environment 500 can automatically generate source code in which exclusive functionality touched by security sensitive code is augmented. For example, the source code that can be automatically generated in a Java™ environment can include String, StringBuffer, and/or StringBuilder. By not augmenting code not getting in touch with security relevant flows unnecessary overhead can be avoided. The functionality of the code, such as code used by secure code, can remain unmodified and intact. In some variations, the security sensitive code can be augmented using an override boot feature. For example, in a Java™ runtime environment, the bootclasspath can be the security sensitive code that is augmented to override the boot feature. Security sensitive code can be identified within an application-specific instrumentation profile 560 provided by an application such as client application 145, 150. As a result, taint-aware runtime environment 500 can generate unique versions of relevant system classes that are tightly tailored to an application's security needs. Such tailoring can result in less augmented code and reduce use of unnecessary computational overhead.

For non-system class code, various sources and sinks can be defined by application-specific instrumentation profile 560. A byte-code instrumentation process can be used to add taint-tracking functionality to the respective source/sink. This instrumentation mechanism can be added into the class loading-process of the runtime environment 570 by an agent 550.

The code augmentation of system class code can be generated utilizing core 530 and templates 540. With a Java® environment, for example, core 530 can generate application specific versions of String, StringBuilder and/or StringBuffer based on application-specific instrumentation profile 560 that can identify which parts of the application service are controlled. Templates 540 can contain the single artifacts (methods, fields, etc.) contained in String, StringBuffer, and/or StringBuilder classes and their augmented, taint-aware counterpart. Core 530 can then generate a taint-aware version of String and related classes for the current client application 145, 150 (e.g., for application-specific instrumentation profile 560) based on source-level stanzas provided by templates 540. Such augmentation can create minimal processing overhead by circumventing the need to modify functionality not listed in the application-specific instrumentation profile 560. The String, StringBuilder, and StringBuffer source files (or any other required classes) can then be compiled using a standard compiler (not shown in FIG. 5) and bundled as an archive package such as a Java™ Archive (JAR) package. The archive package can be added to the bootclasspath of the runtime environment 570 for class lookup during the bootstrapping. This provides taint-tracking functionality to the runtime environment 570 without having to modify the runtime environment itself 570.

Taint-aware runtime environment 500 can modify core parts of the runtime environment 570 circumventing modification of the server-side application server software, the runtime environment 570 installation, and/or the deployment process of client application 145, 150. While only a single taint-aware runtime environment 500 is illustrated and described, it is recognized that two or more taint-aware runtime environments 500 can be run simultaneously to accommodate multiple applications 145, 150 at the same time, each taint-aware runtime environment 500 using different versions of source code.

Agent 550 can augment functions of non-system classes listed as additional sources and sinks which may not be part of the system classes. Instead of source-level modifications (as source-code might not be available in case of third-party applications), byte-code instrumentation can be performed by agent 550 to implement the taint-tracking functionality. Agent 550 can intercept the process of class-loading. Agent 550 can contain a "premain" entry in its manifest file pointing to a class containing a static method named "premain". "Premain" can be called during start-up of client application 145, 150. Once called, client application 145, 150 can receive and register an implementation of the instrumentation interface provided by a virtual machine. When loading any non-system class, the runtime environment 570 then passes the byte-code of this class to the registered ClassFileTransformer and afterwards continues loading using the byte-code returned by it. This enables code needed for tainting strings to be added for a source and/or can provide for alerting/prevention for a sink. Additionally, features like tracing which functions have been passed by a string on its way from source to sink can be added.

A request to execute an application such as client application 145, 150 can be triggered, at 510, by a proxy application. Such triggering can occur at a proxy entry point 520. Proxy entry point 520 can act as an alias for the runtime environment 570 binary. Proxy entry point 520 can forward any received command-line parameters to the actual application but additionally also extends the bootclasspath and initializes the agent 550, after generation of custom system classes by core 530 as previously described. Proxy entry point 520 acts as a launcher by starting the runtime environment 570 with the parameters and the specially generated system classes that are specific to the application.

Figure 6:
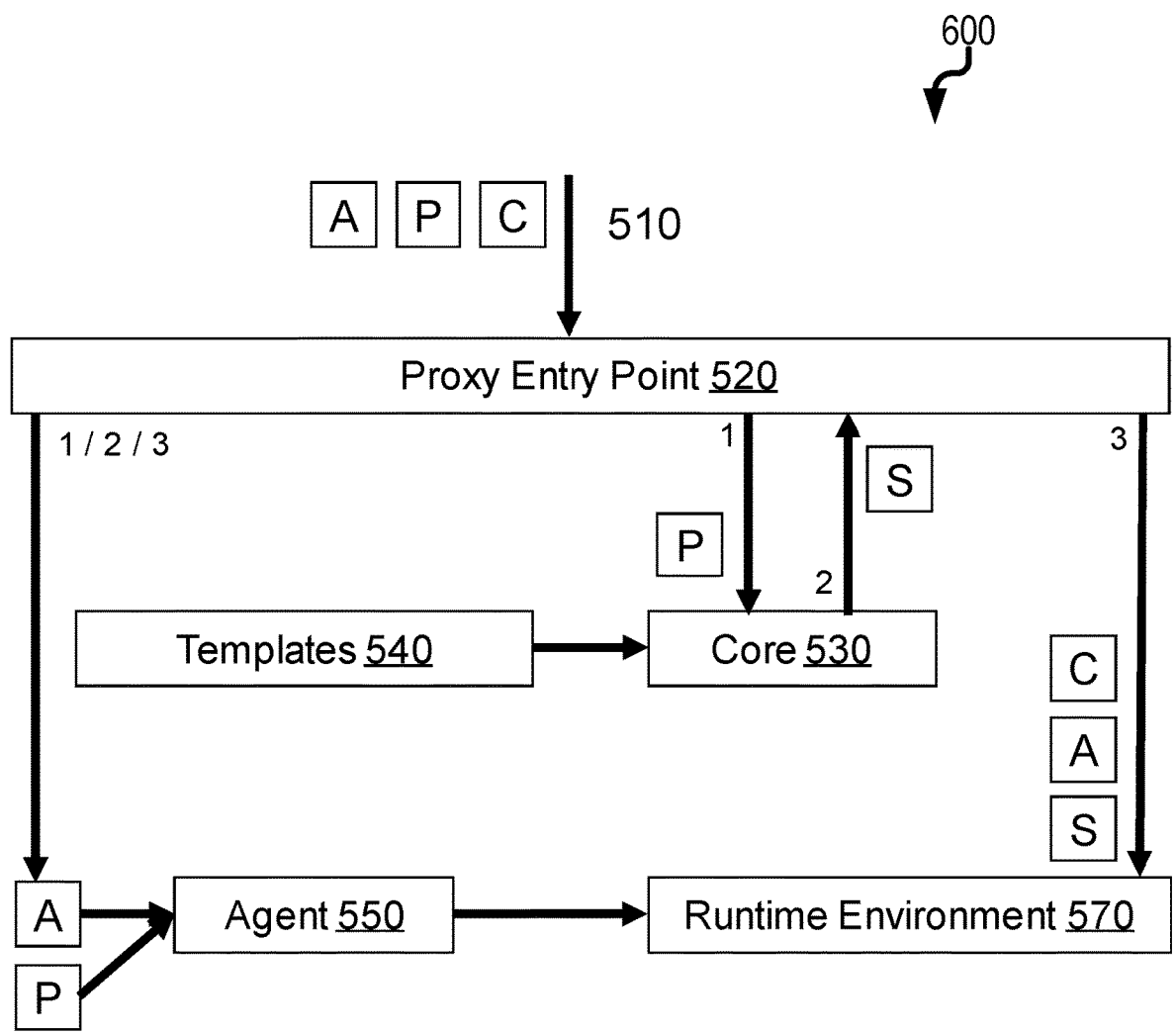
FIG. 6 is an example flow diagram for illustrating interaction between a plurality of taint-tracking components of the taint-aware runtime environment described in FIG. 5.

FIG. 6 is an example flow diagram 600 for illustrating interaction between the plurality of taint-tracking components described in FIG. 5. Upon triggering of a client application 145, 150 via a proxy application, the application to be executed in a taint-aware environment A, having profile parameters, P, (e.g., application-specific instrumentation profile 560) and/or additional command line parameters, C, are passed, at time 1, to proxy entry point 520. The profile parameters, P, are passed from proxy entry point 520 to core 530. Templates 540 interact with core 530 to generate a set of augmented classes (e.g., application-specific String). The set of augmented classes can include taint-tracking functionality such as that described in FIG. 7. Core 530 can provide an archive package, S, that is a generated and combined version of String back to proxy entry point 520 at time 2. Proxy entry point 510, at time 3, provides runtime environment 570 with taint-aware environment, A, archive package, S, and/or additional command line parameters, C. Any time after the triggering of proxy entry point 520, at 510, taint-aware environment, A, and/or profile parameters, P, can be provided to agent 550 by proxy entry point 520. Agent 550, after performing the various operations described previously, can provide the set of augmented classes of sources and/or sinks to runtime environment 570.

FIG. 7 is an example taint-tracking application 700 using a character-level, multi-source tracking approach. With character-level tracking taint-information can be maintained for each character within a string. As illustrated in FIG. 7, an array of characters can make up the string "HELLO WORLD." Character level taint-tracking can identify tainted characters using taint-flags. Taint-flags can include binary-flags, byte-flags, or flags of arbitrary sizes. The amount of memory consumed by the processing system can be weighed against the number of distinguishable taint-sources needed. FIG. 7 illustrates example byte-flags. For example, a byte-flag of "1" or "2" can identify tainted characters and a flag of "0" can identify untainted characters. In the example of FIG. 7, both "O" letters are identified as tainted, while the letters "H", "E", "L", "N", "R", and "D" are identified as untainted. With byte-flags, values can be correlated to characters along a spectrum of 0 to 255. Taint-tracking can also be performed at a string-level, where each string is marked as tainted as appropriate. String-level granularity massively reduces the precision of the system and is therefore not suitable in the context of detecting injection-attacks.

Figure 8:
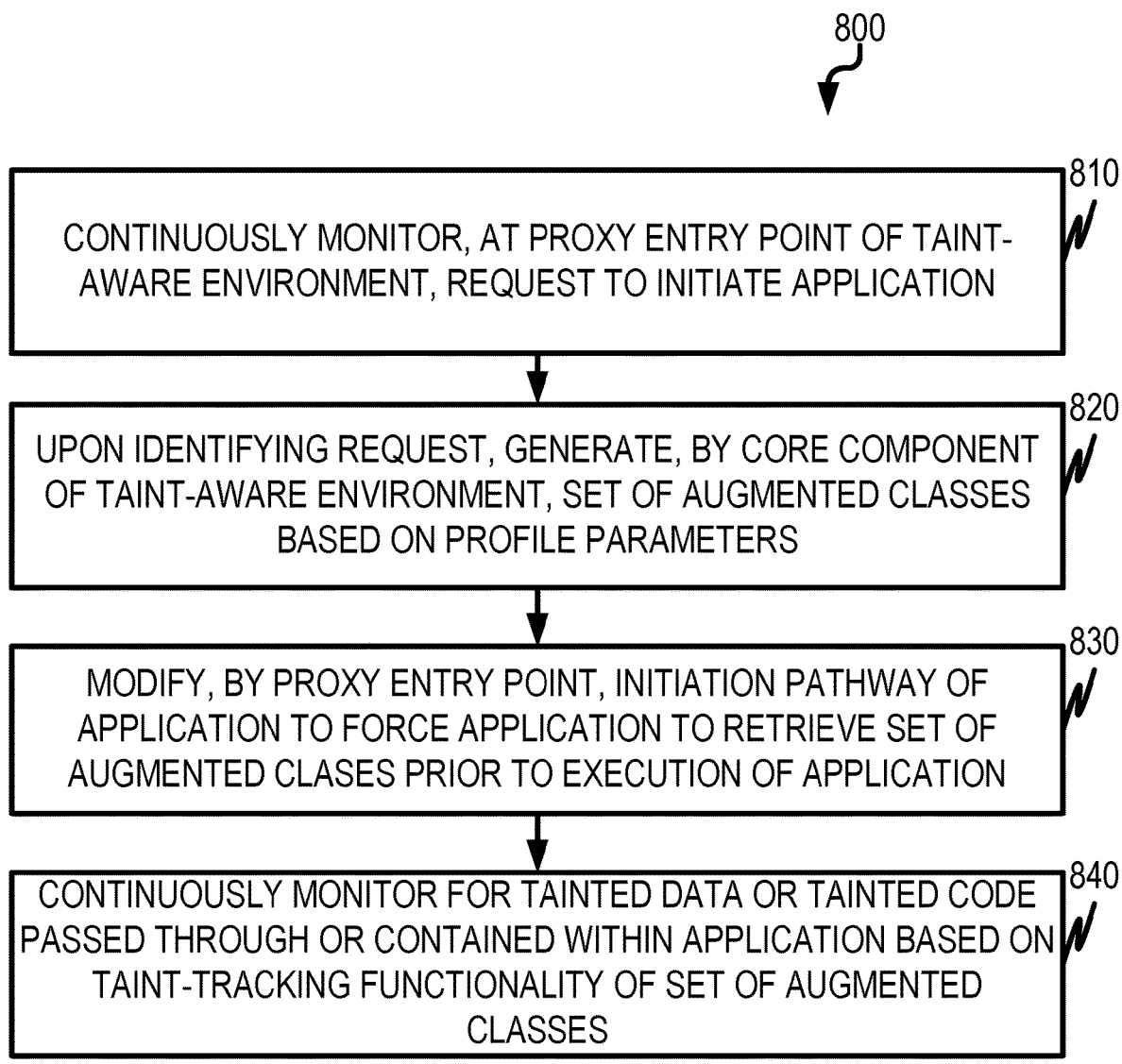
FIG. 8 is an example flow diagram for taint-tracking using a taint-aware runtime environment.

FIG. 8 is an example flow diagram 800 for taint-tracking using a taint-aware runtime environment. A request to initiate an application (e.g., client application 145, 150) can be continuously monitored for, at 810, by a proxy entry point 520. The application can include an associated runtime environment and profile parameters specific to the application. Upon identifying the request, a core component of the taint-aware environment can generate, at 820, a set of augmented classes suiting the specific security needs of the application given based on its profile parameters. For example, the set of augmented classes can be compiled as plain text or packed. The augmented classes can contain taint-tracking functionality. An initiation pathway of the application can be modified, at 830, by the proxy entry point, to force the runtime environment to retrieve the set of augmented classes prior to execution of the application. The runtime environment can continuously monitor, at 840, for tainted data or tainted code passed through or contained within the application based on the taint-tracking functionality of the set of augmented classes. In some variations, the runtime environment can identify tainted data or tainted code based on the taint-tracking functionality. Based on the identification of tainted data or tainted code (e.g., tainted information), the tainted data or the tainted code can be remedied by providing a user alert on a (graphical) user interface, preventing the application from executing, and/or injecting identification data into the tainted data or the tainted code to flag the presence of the tainted data or the tainted code.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 9:
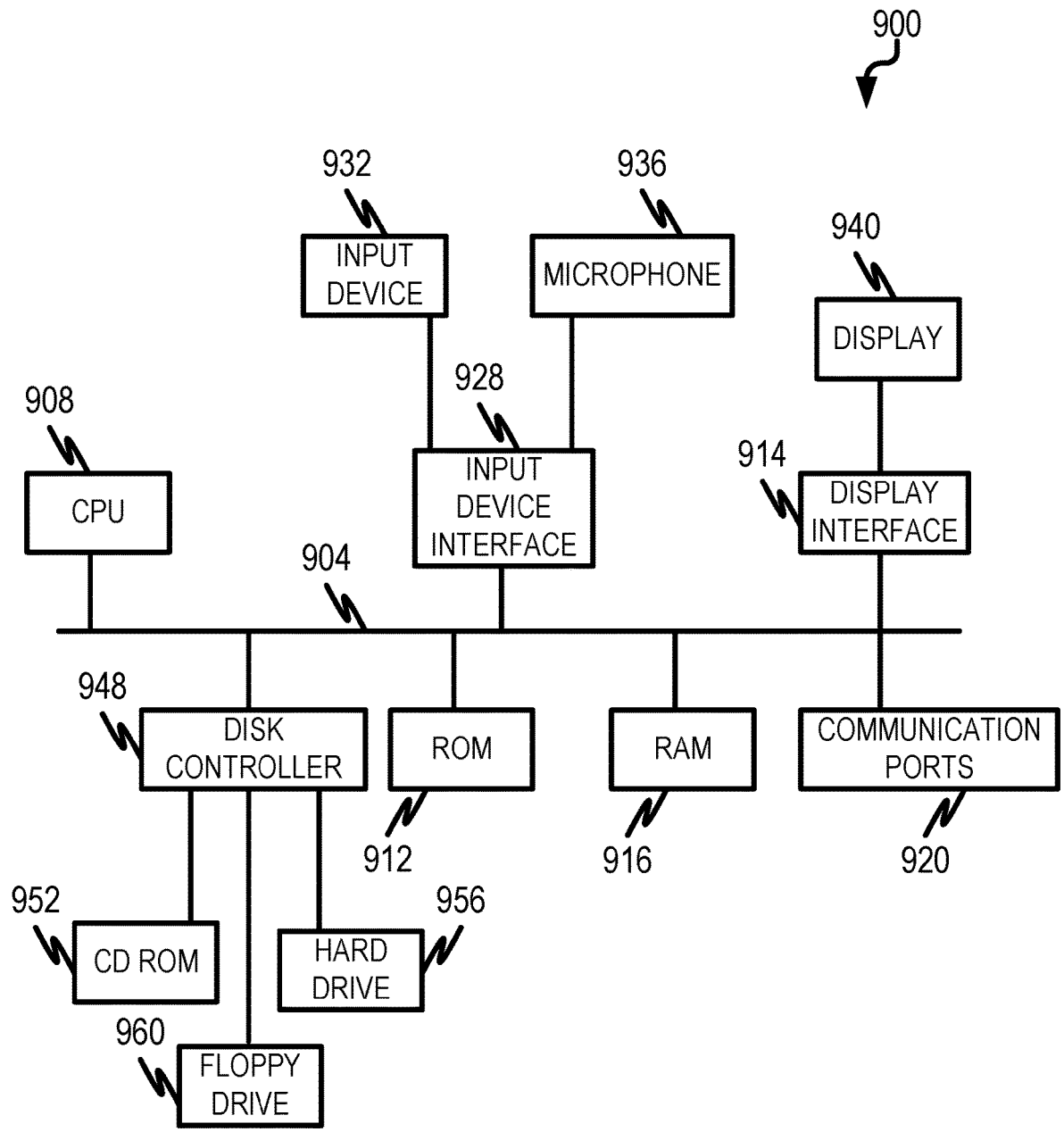
FIG. 9 is a diagram illustrating a sample computing device architecture for implementing various aspects described herein.

FIG. 9 is a diagram 900 illustrating a sample computing device architecture for implementing various aspects described herein. A bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 948 can interface one or more optional disk drives to the system bus 904. These disk drives can be external or internal floppy disk drives such as 960, external or internal CD-ROM, CD-R, CD-RW or DVD, or solid state drives such as 952, or external or internal hard drives 956. As indicated previously, these various disk drives 952, 956, 960 and disk controllers are optional devices. The system bus 904 can also include at least one communication port 920 to allow for communication with external devices either physically connected to the computing system or available externally through a wired or wireless network. In some cases, the communication port 920 includes or otherwise comprises a network interface.

To provide for interaction with a user, the subject matter described herein can be implemented on a computing device having a display device 940 (e.g., a CRT (cathode ray tube) or LCD (liquid crystal display) monitor) for displaying information obtained from the bus 904 to the user and an input device 932 such as keyboard and/or a pointing device (e.g., a mouse or a trackball) and/or a touchscreen by which the user can provide input to the computer. Other kinds of input devices 932 can be used to provide for interaction with a user as well; for example, feedback provided to the user can be any form of sensory feedback (e.g., visual feedback, auditory feedback by way of a microphone 936, or tactile feedback); and input from the user can be received in any form, including acoustic, speech, or tactile input. In the input device 932 and the microphone 936 can be coupled to and convey information via the bus 904 by way of an input device interface 928. Other computing devices, such as dedicated servers, can omit one or more of the display 940 and display interface 914, the input device 932, the microphone 936, and input device interface 928.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by one or more data processor forming one or more computing devices, the method comprising:
   continuously monitoring, at a proxy entry point component of a taint-aware environment, for a request to initiate an application, the application having an associated runtime environment and profile parameters specific to the application;
   upon identifying the request, generating, by a core component of the taint-aware environment, a set of augmented classes comprising application specific strings for the application based on the profile parameters, the set of augmented classes containing taint-tracking functionality;
   modifying, by the proxy entry point component, an initiation pathway of the application to force the runtime environment to retrieve the set of augmented classes prior to execution of the application; and
   continuously monitoring, by the runtime environment, for tainted data or tainted code passed through or contained within the application based on the taint-tracking functionality of the set of augmented classes, wherein the tainted data or the tainted code comprise one or more tainted strings identified based on the application specific strings.

2. The method of claim 1, further comprising:
   identifying, by the runtime environment, tainted data or tainted code based on the taint-tracking functionality of the set of augmented classes; and
   remedying, by the runtime environment, the tainted data or the tainted code by at least one of providing a user alert on a graphical user interface, preventing the application from executing, or injecting identification data into the tainted data or the tainted code to flag the presence of the tainted data or the tainted code.

3. The method of claim 1, wherein the set of augmented classes includes system class code or non-system class code.

4. The method of claim 1, further comprising modifying, by an agent component of the taint-aware environment, the non-system class code using byte-code instrumentation to include the taint-tracking functionality.

5. The method of claim 1, wherein the set of augmented classes are identified by an application-specific instrumentation profile.

6. The method of claim 1, wherein the core component interfaces with a template component containing stanzas to generate the set of augmented classes using stored string templates.

7. The method of claim 1, wherein the taint tracking functionality identifies the tainted data or the tainted code at a character level.

8. The method of claim 1, wherein the application further includes at least one command line parameter provided by a user of the application.

9. The method of claim 1, wherein the application specific strings are bundled as an archive package for class lookup during initialization of the application.

10. A system comprising:
    at least one data processor;
    memory storing instructions which, when executed by the at least one data processor, result in operations comprising:
      continuously monitoring, at a proxy entry point component of a taint-aware environment, for a request to initiate an application, the application having an associated runtime environment and profile parameters specific to the application;
      upon identifying the request, generating, by a core component of the taint-aware environment, a set of augmented classes comprising application specific strings for the application based on the profile parameters, the set of augmented classes containing taint-tracking functionality;
      modifying, by the proxy entry point component, an initiation pathway of the application to force the runtime environment to retrieve the set of augmented classes prior to execution of the application; and
      continuously monitoring, by the runtime environment, for tainted data or tainted code passed through or contained within the application based on the taint-tracking functionality of the set of augmented classes, wherein the tainted data or the tainted code comprise one or more tainted strings identified based on the application specific strings.

11. The system of claim 10, wherein the operations further comprise:
    identifying, by the runtime environment, tainted data or tainted code based on the taint-tracking functionality of the set of augmented classes; and remedying, by the runtime environment, the tainted data or the tainted code by at least one of providing a user alert on a graphical user interface, preventing the application from executing, or injecting identification data into the tainted data or the tainted code to flag the presence of the tainted data or the tainted code.

12. The system of claim 10, wherein the set of augmented classes includes system class code or non-system class code.

13. The system of claim 10, wherein the operations further comprise modifying, by an agent component of the taint-aware environment, the non-system class code using bytecode instrumentation to include the taint-tracking functionality.

14. The system of claim 10, wherein the set of augmented classes are identified by an application-specific instrumentation profile.

15. The system of claim 10, wherein the core component interfaces with a template component containing stanzas to generate the set of augmented classes using stored string templates.

16. The system of claim 10, wherein the taint tracking functionality identifies the tainted data or the tainted code at a character level.

17. The system of claim 10, wherein the application further includes at least one command line parameter provided by a user of the application.

18. The system of claim 10, further comprising an in-memory database storing the memory storing instructions.

19. A non-transitory computer-programmable product including storing instructions which, when executed by at least one data processor forming part of at least computing system, result in operations comprising:
    continuously monitoring, at a proxy entry point component of a taint-aware environment, for a request to initiate an application, the application having an associated runtime environment and profile parameters specific to the application;
    upon identifying the request, generating, by a core component of the taint-aware environment, a set of augmented classes comprising application specific strings for the application based on the profile parameters, the set of augmented classes containing taint-tracking functionality;
    modifying, by the proxy entry point component, an initiation pathway of the application to force the runtime environment to retrieve the set of augmented classes prior to execution of the application; and
    continuously monitoring, by the runtime environment, for tainted data or tainted code passed through or contained within the application based on the taint-tracking functionality of the set of augmented classes, wherein the tainted data or the tainted code comprise one or more tainted strings identified based on the application specific strings.

20. The non-transitory computer-programmable product of claim 19, wherein the operations further comprise:
    identifying, by the runtime environment, tainted data or tainted code based on the taint-tracking functionality of the set of augmented classes; and
    remedying, by the runtime environment, the tainted data or the tainted code by at least one of providing a user alert on a graphical user interface, preventing the application from executing, or injecting identification data into the tainted data or the tainted code to flag the presence of the tainted data or the tainted code; and
    modifying, by an agent component of the taint-aware environment, the non-system class code using bytecode instrumentation to include the taint-tracking functionality.

* * * * *